United States Patent Office 3,297,613
Patented Jan. 10, 1967

3,297,613
VINYLIDENE CHLORIDE-ACRYLATE-AMIDE INTERPOLYMER
Dale S. Gibbs, Midland, Mich., assignor to The Dow Chemical Company, Midland, Mich., a corporation of Delaware
No Drawing. Filed Feb. 4, 1963, Ser. No. 256,110
4 Claims. (Cl. 260—29.6)

This invention relates to aqueous dispersions of vinylidene chloride interpolymers and a process for preparing the same. More particularly, it relates to stable, substantially emulsifier free, aqueous colloidal dispersions of interpolymers of vinylidene chloride, which contain substantially water-soluble, polymerizable, ethylenically unsaturated carboxylic acid amides.

Polymeric materials containing characterizing amounts of 50 percent or more vinylidene chloride are known to possess a community of properties making them well adapted for a wide diversity of end uses. Among these properties may be mentioned non-flammability, low permeability, chemical inertness, high impact and tensile strength, and other desirable physical and chemical properties.

In the well-known art of preparing aqueous dispersions of vinylidene chloride polymers, the monomeric constituents are usually colloidally emulsified in an aqeous medium that contains a wetting agent or surfactant, such as a water-soluble alkali soap, and/or an ionic polymerization catalyst as potassium persulfate. The resulting colloidal emulsion is then subjected to conditions conducive to polymerization of the monomeric constituents to produce an aqueous colloidal dispersion of the corresponding polymeric material, the aqueous colloidal dispersion being commonly called a latex.

The stability of the resulting polymer (aqueous colloidal dispersion) against coagulation of its polymeric ingredients depends upon the amounts and nature of wetting agents and the like that are contained in the aqueous suspending medium. In many instances, the dispersions are quite unstable, particularly when subjected to mechanical agitation, to heat or cold, or upon addition to the dispersion, of polyvalent ions such as ionized calcium salts, such influences causing coagulation of the polymer particles. In some instances, particularly when forming redispersible vinylidene chloride polymers, additional amounts of surfactants or other stabilizers are added to the colloidal dispersion after completion of the polymerization step. However, latices stabilized with external surfactants are stable only to a limited degree and are often vulnerable to external destabilization.

Moreover, in many instances and for many purposes, the conventionally employed, water-soluble, surfactants and stabilizers (added to increase the latex stability and/or to enhance the redispersibility of the so-formed polymeric material) are objectionable. For example, such aqueous dispersions often require the addition of excessive amounts of non-ionic emulsifiers to make them colloidally stable to polyvalent electrolytes. Additionally, in coatings derived from aqueous latices by separation of water from a layer of such latex, the non-volatile surfactants remain together with the polymer deposit, and in many instances seriously and deleteriously effect the quality of the coating. Furthermore, prior redispersible polymeric materials have been found to be extremely water-sensitive when incorporated in concrete, mortar, and cement mortar compositions and thus are generally unacceptable as effective modifiers for increasing the wet-strength properties of such compositions.

It is an object of this invention to provide a process and compositions therefor, for the preparation of stable, aqueous colloidal dispersions of solid interpolymers of vinylidene chloride.

A further object is to provide a process and compositions therefor, to obtain stable, substantially emulsifier free, aqueous dispersions of interpolymers of vinylidene chloride.

Yet another object is to provide a process and compositions therefor, to obtain stable, aqueous dispersions of interpolymers of vinylidene chloride which are redispersible and are particularly useful as modifiers for concrete, mortar, and cement mortar compositions.

Other and related objects will become evident from the following description of the invention.

The foregoing and related objects may be attained by the continuous polymerization in aqueous medium containing catalytic amounts of a non-ionic, free-radical polymerization catalyst and in the substantial absence of conventionally used wetting agents or surfactants, of (1) at least 50 weight percent vinylidene chloride, (2) between 1 and 45 weight percent of at least 1 substantially water-insoluble monoethylenically unsaturated comonomer, and (3) between about 0.5 and 25 weight percent of a substantially water-soluble, polymerizable, ethylenically unsaturated carboxylic acid amide, the total weight of the polymerizable constituents being 100 percent.

It has now been found that when vinylidene chloride polymers, as described herein, are prepared in aqueous colloidal dispersion in accordance with this invention, such polymer products are internally stabilized in the aqueous colloidal dispersion, and the resulting dispersions are very stable without the presence therein of conventionally used water-soluble wetting agents and surfactants. It may be suggested that the dispersions contain solid polymer particles in which the polymerizable carboxylic acid amide useful for the present invention, is polymerically combined with the essentially water-insoluble vinylidene chloride polymer, and in which the surface layer of the polymer particles contains a preponderance of such polymerically combined carboxylic acid amide.

As purely exemplary of the substantially water-insoluble monoethylenically unsaturated comonomers suitable for the present invention are: vinyl chloride, vinyl acetate, vinyl propionate, acrylonitrile, and alkyl acrylates and alkacrylates having alkyl groups containing from 1 to about 8 carbon atoms. Typical of such alkyl acrylates and alkacrylates are: methyl acrylate, ethyl acrylate, butyl acrylate, isobutyl acrylate, 2-ethylhexyl acrylate, and the corresponding methacrylic, ethacrylic and propacrylic acid ester, among others.

The water-soluble, polymerizable, ethylenically unsaturated carboxylic acid amides of the present invention include amides of both monocarboxylic acids and polycarboxylic acids. Particularly suitable are those polymerizable carboxylic acid amides having up to about 4 carbon atoms. As purely exemplary of such polymerizable carboxylic acid amides are: acrylamide, N-methylolacrylamide, N-hydroxyethyl acrylamide, and fumaric acid diamide, among many others.

The improved process of polymerization according to the invention comprises preparing an aqueous dispersion of the herein described polymeric materials, by the continuous, carefully controlled, addition of the requisite monomeric constituents to the aqueous medium in the presence of a non-ionic polymerization catalyst, exemplary of which are hydrogen peroxide and cumene hydroperoxide. In redox polymerization systems, the usual ingredients may be used. The aqueous medium may additionally contain acids, bases, or salts to provide a desired pH value and possibly a buffer system. Generally a pH value of about 3.0 is preferred. In the process of the present invention it is often preferred to first add a small amount of the monomeric constituents of the essentially water-insoluble vinylidene chloride interpolymer to the aqueous medium having the desired pH value, followed by the subsequent addition of the necessary polymerization catalyst, to form a polymeric seed particle composed essentially of the vinylidene chloride interpolymer. When forming such polymeric seed particles by the procedure as described herein, small amounts, for example, about 0.05 weight percent of a conventional wetting agent may be incorporated in the aqueous medium to aid in the attainment of particles of desired size. The addition of such wetting agents, however, is not required for the production of the highly stable aqueous colloidal dispersions of the present invention. Following formation of the polymeric seed particles, the remaining essentially water-insoluble monomeric constituent of the vinylidene chloride interpolymer and the hydrophilic polymerizable carboxylic acid amide constituent are simultaneously and continuously added under carefully controlled conditions to the aqueous medium, to form a polymer particle wherein at least a portion of the polymerizable carboxylic acid amide is polymerically combined with the essentially water-insoluble vinylidene chloride polymer.

It has been found that the highly stable aqueous colloidal dispersions as described by the present invention are produced only when the requisite monomeric constituents are continuously polymerized in an aqueous medium as described herein. In this regard, it has been found that when all of the polymerizable carboxylic acid amide useful for the present invention is added to the aqueous medium by conventionally used batch polymerization techniques, excessive homopolymerization of such hydrophilic monomeric material occurs with resultant formation of undesirable coagulum and/or undesirably high latex viscosities. Generally, undesirably high viscosities result in latices prepared by conventional batch polymerization techniques when the hydrophilic, polymerizable carboxylic acid amides, as described herein, are present in amounts greater than about 2 weight percent, based on the total weight of the polymerizable constituents. Additionally, conventionally used polymerization procedures in which the polymerization is carried out by conventionally used "shot-wise" polymerization generally does not produce the highly stable aqueous colloidal dispersions of the present invention.

It is suggested that the most beneficial results are obtained when the continuous addition of the monomeric constituents is carefully controlled so that the water-soluble polymerizable carboxylic acid amide, as defined herein, is polymerically combined with the surface of the essentially water-insoluble vinylidene chloride interpolymer particle. Such control may be realized by proper adjustment of the amounts and of the rates of addition of the individual monomeric constituents to the aqueous medium.

The compositions, as described herein, are subjected to conditions conducive to polymerization of the polymerizable constituents. In most instances, the temperature of the aqueous dispersion is raised, for example to a temperature between about 40° C. and 100° C. to activate the polymerization, although, in some instances, particularly those wherein a very active polymerization catalyst is used, the polymerization can occur at or below room temperature. Other means, such as exposure of the composition to activating radiation, can be employed to promote polymerization of the polymerizable constituents.

The aqueous dispersions of the present invention are characteristically very colloidally stable, i.e., resistance to coagulation of the colloidally dispersed polymer particles, even though they contain only very little or no conventional emulsifier or stabilizer. In many instances, the polymer dispersions can be mixed with concentrated calcium chloride solutions without causing coagulation of the polymer. In many instances, the dispersion can be vigorously agitated without coagulation under conditions that cause substantial precipitation of ordinary dispersions. Additionally, the dispersions of the present invention have little tendency to foam due to the substantial absence of conventional water-soluble emulsifiers and the like. Furthermore, dry interpolymers obtained by the separation of the aqueous portion from the colloidal dispersions of the present invention, which contain from about 3 to 25 weight percent of the polymerizable, ethylenically unsaturated carboxylic acid amide as described herein, have been found to be easily redispersible in water and, unexpectedly, are advantageously resistant to water when cured, as for example, when formed into dried film and heat treated or when present in cured concrete, mortar, and cement mortar compositions. Such redispersible materials have been found to be of particular value as modifiers for concrete, mortar, and cement mortar compositions.

The following examples, wherein all parts and percentages are to be taken by weight, illustrate the present invention but are not construed as limiting its scope.

EXAMPLE I

Into a polymerization vessel was charged a mixture of 1350 milliliters of water (adjusted to a pH value of 3.0 with hydrochloric acid), 30 grams of acrylamide, and 20 p.p.m. of ferric ammonium sulfate. To this aqueous medium was subsequently added an initial charge of a mixture of substantially water-insoluble polymerization materials comprising: 70 grams of vinylidene chloride, 20 grams of butyl acrylate and 10 grams of methyl acrylate. The reaction mixture was then stirred under nitrogen for a period of 5 minutes at 45° C., and 10 milliliters of 30 percent hydrogen peroxide subsequently added. The reaction mixture was then allowed to stir at 45° C. for a period of 1 hour, and a solution comprising 60 grams of acrylamide in 180 milliliters of water, and a second charge of essentially water-insoluble monomeric materials comprising: 630 grams of vinylidene chloride, 180 grams of butyl acrylate and 90 grams of methyl acrylate were then separately but simultaneously added with stirring to the aqueous medium over a period of 12 hours.

The resulting polymerization product was a highly stable latex, for example, aqueous colloidal polymer dispersion, containing approximately 30 percent of a solid vinylidene chloride/butyl acrylate/methyl acrylate polymer product having acrylamide polymerically bound therein. The latex was stable, even in the presence of polyvalent metal cations such as calcium ions.

Additionally, upon evaporation of the aqueous constituents of said colloidal dispersion, a solid, free-flowing polymeric powder was obtained which was readily redispersible in water.

EXAMPLE II

The latex of Example I was tested for stability in a Portland cement mortar mix. In this test, the mortar combinations were formulated at a ratio of latex solids to cement of about 0.15/1. Each of the mortar combinations prepared for testing contained a ratio of about 3 parts of sand to about 1 part of cement by weight.

The sand and Portland cement were thoroughly mixed and the required amounts of latex added thereto. The entire formulation was then mixed in a Hobart type mixer until an even consistency resulted. After the preliminary setting of the mortar, the samples were "dry cured" by aging the same for 14 days at about 70° F. at a relative humidity of about 60 percent. Individual portions of the samples were then "wet cured" by immersing the same in water heated to a temperature of 75° F. with a total immersion time of 7 days.

The following Table I, illustrates the dry and wet shear bond strengths, the dry and wet compressive strengths, and the dry and wet tensile strength of the latex modified cement mortar mix as compared to a non-modified similarly prepared cement mortar mix.

TABLE I

| Formulation | Shear Bond Strength, p.s.i. | | Compressive Strength, p.s.i. | | Tensile Strength, p.s.i. | |
|---|---|---|---|---|---|---|
| | Dry | Wet | Dry | Wet | Dry | Wet |
| For Comparison: Unmodified Cement Mortar | 180 | 190 | 1,470 | 900 | 150 | 100 |
| This Invention: Latex Modified Cement Mortar | 710 | 480 | 5,500 | 4,850 | 882 | 603 |

Similar good results are obtained when the solid free-flowing polymer powder as described in Example I, is mixed with the herein described cement mortar mix which contains water in amounts sufficient to redisperse such polymer material into its latex form.

Highly stable, essentially emulsifier free aqueous colloidal dispersions are similarly prepared by the process of this invention by the polymerization of (1) at least 50 weight percent vinylidene chloride, (2) between 1 and 45 weight percent of at least one substantially water-insoluble monoethylenically unsaturated comonomer as defined herein, and (3) between 0.5 and 25 weight percent of a substantially water-soluble polymerizable carboxylic acid amide as defined herein; wherein the sum of the weight of the polymerizable constituents totals 100 percent.

What is claimed is:

1. A process for making a solid, free-flowing vinylidene chloride interpolymer which is easily redispersed in water to a latex form in the absence of wetting agents, which process consists of:
   (I) simultaneously and continuously adding and polymerizing, in an aqueous medium containing catalytic amounts of a substantially non-ionic free-radical catalyst, (1) at least about 50 weight percent vinylidene chloride, (2) between about 1 and 45 weight percent of at least one substantially water-insoluble monoethylenically unsaturated comonomer, selected from the group consisting of alkyl acrylates and alkyl alkanoates having alkyl groups containing from 1 to about 8 carbon atoms and (3) between about 3 and 25 weight percent of a substantially water-insoluble polymerizable ethylenically unsaturated carboxylic acid amide, the total weight of the polymerizable constituents being 100 percent, and
   (II) separating said interpolymer from said aqueous medium.

2. The process of claim 1 wherein a seed particle of desired size is first prepared by an initial polymerization of a minor portion of the polymerizable constituents.

3. The process of claim 1 wherein said alkyl acrylate is a mixture of butyl acrylate and methyl acrylate.

4. The process of claim 3 wherein said substantially water-soluble polymerizable ethylenically unsaturated carboxylic acid amide is acrylamide.

References Cited by the Examiner

UNITED STATES PATENTS

| 2,673,191 | 3/1954 | Wolf | 260—29.6 |
| 2,872,438 | 2/1959 | Carrol et al. | 260—89.7 |
| 2,989,517 | 6/1961 | Hanson et al. | 260—95 |

FOREIGN PATENTS 886,141   2/1962   Great Britain.

OTHER REFERENCES

Schildknecht, Vinyl and Related Polymers, Wiley and Sons, New York.

MURRAY TILLMAN, *Primary Examiner.*

J. ZIEGLER, *Assistant Examiner.*